United States Patent [19]

Meath et al.

[11] 4,246,155

[45] Jan. 20, 1981

[54] BLEND OF ASBESTOS FIBERS, CARBOXYLATED COPOLYMER LATEX AND SYNTHETIC RUBBER LATEX

[75] Inventors: Kenneth R. Meath; Kent B. McReynolds, both of Midland; Donald M. Blake, Sanford, all of Mich.

[73] Assignee: The Dow Chemical Company, Midland, Mich.

[21] Appl. No.: 4,419

[22] Filed: Jan. 18, 1979

[51] Int. Cl.$^3$ .................. C08L 25/10; C08L 31/02
[52] U.S. Cl. .................. 260/29.7 W; 260/29.6 RW; 428/521; 428/522
[58] Field of Search .................. 260/29.7 W, 29.6 RW

[56] References Cited

U.S. PATENT DOCUMENTS

| | | | |
|---|---|---|---|
| 1,956,053 | 4/1934 | Tucker | 92/21 |
| 2,759,813 | 8/1956 | Feigley | 92/21 |
| 3,035,004 | 5/1962 | Glavis | 260/29.7 W |
| 3,193,446 | 7/1965 | Eisenberg | 162/145 |
| 3,838,085 | 9/1974 | Myers et al. | 260/29.6 RW |

Primary Examiner—Harold D. Anderson

[57] ABSTRACT

Compositions comprising asbestos fibers and blends of at least two latexes wherein the solids in the blended latexes comprise (A) from 5 to 40 parts by weight of a carboxylated copolymer comprising 10 to 25 parts by weight of methacrylic acid and correspondingly 90 to 75 parts by weight of at least one unsaturated carboxylic acid ester of the formula $CH_2=C(R_2)COOR_1$, wherein $R_1$ is an alkyl group containing 1 to 8 carbon atoms and $R_2$ is hydrogen or methyl and (B) 95 to 60 parts by weight of at least one synthetic rubber. The binder composition employed in this invention provides asbestos sheets having utility in flooring felts and gasket materials having relatively little change in elongation at room temperature, at 350° F. and after soaking in dioctylphthalate.

5 Claims, No Drawings

BLEND OF ASBESTOS FIBERS, CARBOXYLATED COPOLYMER LATEX AND SYNTHETIC RUBBER LATEX

BACKGROUND OF THE INVENTION

1. Field of the Invention

This invention relates to novel compositions comprising asbestos fibers and blends of latexes which are comprised of a synthetic rubber and a carboxylated copolymer which have been found to impart solvent or plasticizer resistance to asbestos-containing flooring felts and gasket material.

2. Description of the Prior Art

Asbestos flooring sheets have commonly had marginal to poor resistance to the phthalate plasticizer used in the polyvinyl chloride coating applied to the surface of the asbestos sheet. Typically such systems would absorb up to 80% of their weight of plasticizers and they would lose over 80% of their original physical properties and become too weak to process. For example, if a coated sheet was left threaded through a coating machine overnight, the sheet would break at start-up the following day and rethreading would be necessary. The resulting loss in time was costly and unnecessary.

SUMMARY OF THE INVENTION

This invention provides a novel composition comprising asbestos fibers and a blend having a pH of 7 or less, of at least two latexes wherein the solids in the blended latexes comprise (A) from 5 to 40 parts by weight of a carboxylated copolymer comprising 10 to 25 parts by weight of methacrylic acid and correspondingly 90 to 75 parts by weight of at least one unsaturated carboxylic acid ester of the formula $CH_2=C(R_2)COOR_1$, wherein $R_1$ is an alkyl group containing 1 to 8 carbon atoms and $R_2$ is hydrogen or methyl and (B) 95 to 60 parts by weight of at least one synthetic rubber. The binder composition employed in this invention is storage stable, i.e. there is little or no increase in viscosity with time, and asbestos sheets prepared employing this composition have relatively little change in elongation at room temperature, at 350° F. and after soaking in dioctylphthalate for 18 hours.

DETAILED DESCRIPTION OF THE INVENTION

The synthetic rubber employed in this invention may be any anionically stabilized elastomer such as, for example, a styrene-butadiene rubber, a butadiene-vinylidene chloride rubber, a styrene-acrylate rubber or a butadiene-acrylonitrile rubber. In each of such products the butadiene or acrylate moiety advantageously comprises from 40 to 70 parts by weight of the polymer with the styrene, vinylidene chloride or acrylonitrile moiety comprising from 30 to 60 parts by weight. Minor amounts of other comonomers such as, for example, fumaric, acrylic or itaconic acid are advantageously present. The preferred rubber is a styrene-butadiene-carboxylic acid terpolymer. Component (A) is an alkali swellable polymer and is advantageously a terpolymer of methacrylic acid, ethyl acrylate and methyl methacrylate and most preferably is such a terpolymer prepared from about 20 parts by weight of methacrylic acid, about 24 parts by weight of ethyl acrylate and about 56 parts by weight of methyl methacrylate.

The latex blend of this invention is advantageously added to an aqueous dispersion of asbestos fibers in an amount sufficient to provide about 10–30 weight percent latex solids based on the dry weight of the asbestos fibers, which are present in an amount of about 1 to 6 weight percent of the total slurry. Handsheets can be readily formed from this slurry in the known manner.

The carboxylated copolymer (A) advantageously comprises from 10 to 30 parts by weight of the latex solids and most preferably comprises from 15 to 25 parts by weight of the latex solids.

If desired, the synthetic rubber binder may be deposited on the fibers with the aid of certain sequestering or chelating agents which are added to the slurry prior to the addition of the synthetic rubber latex which is to be coagulated to form the binder of the asbestos sheet material. These sequestering agents apparently form a nonionizing complex with the metallic ions present in the water and thereby prevent partial precipitation of the binder solids before the desired mixing of the latex and the fibers can be obtained. The sequestering agents used may be selected water-soluble polycarboxylic acids and/or water-soluble salts thereof. The polycarboxylic acids are tricarboxylic acids such as citric acid and tetracarboxylic acids such as ethylene diamine tetraacetic acid. Examples of the water-soluble salts of such acids which may be used are the ammonium and the alkali metal salts such as sodium, potassium, and lithium salts of the acids set forth above. Generally speaking, particularly advantageous results are obtained when the sodium salts of the selected polycarboxylic acids are employed. The deposition of synthetic rubber binders on asbestos fibers for the purpose of sheet formation is more fully set forth in U.S. Pat. No. 2,759,813, issued Aug. 21, 1956.

The procedure employed to prepare the handsheets of the following examples was to add 250 grams of asbestos fibers (Paperbestos #5 from Johns-Manville Corporation) to 6 liters tap water in a ten-quart stainless steel pail at 27° C. ± 1.0° C. and stir on a disintegrator for five minutes. The amount of wet latex necessary to provide about 15% solids, based on dry fiber, was measured and water was added to bring the latex solids to 38.9%. The asbestos water slurry was then placed in a mixer and stirred at 1200 rpm while the latex was added in a 10 second period. Stirring was continued until the latex was entirely precipitated onto the asbestos fibers as shown by removing a portion of the slurry and checking for water clarity. When the water was clear, the mixer was stopped and the time from beginning of latex addition to shut-off was recorded.

Freeness was determined utilizing a Williams Freeness tester and 75 grams of the asbestos-latex-water slurry. The heel of the tester was filled level full with 54° C. distilled water, the screen placed in position and the tester closed and locked to the 1000 ml mark. Final water temperature was 49° C., which was checked while stirring to obtain uniform slurry dispersion. Slurry rotation was stopped and a gentle swirling motion imparted, a motion which stopped when about 750 to 850 ml of water had drained through the screen. The time required to drain the slurry to the zero mark is the freeness time.

Sheets were formed by placing a grid plate covered with 80 mesh bronze screen in the sheet former and adding tap water (124° F.) to cover the grid plate 2–3 inches and then adding 1090 grams of a 4% asbestos water slurry. Water was then added until the level was 10 inches above the grid plate and the slurry stirred until uniformly mixed. Drain time was then recorded, the resulting sheet was placed between TAPPI blotter paper, pressed at 900 pounds per square inch pressure for 30 seconds and dried in a hot air oven for 20 minutes at 110° C. The sheet, 7"×7" and about 1/32 inch thick, is then ready for further testing.

EXAMPLE 1 (COMPARATIVE)

The latex blend employed in this example was a blend of (A) 13.33 parts by weight, solids basis, of a latex comprising 60 parts by weight methacrylic acid, 20 parts by weight of methyl methacrylate and 20 parts by weight of ethyl acrylate and correspondingly, (B) 86.67 parts by weight, solids basis, of a latex comprising 61 parts by weight styrene, 37 parts by weight butdadiene and 2 parts by weight fumaric acid at a pH of 4–5. Ammonium acetate, 1.25 grams, was added to facilitate deposition. This blend had to be used shortly after mixing as the viscosity rapidly increased until the mixture was too thick to pump. The results are set forth in the table following Example 4.

EXAMPLE 2 (COMPARATIVE)

Latex B of Example 1 was employed as the sole binder. This latex was storage stable and no deposition aid was employed. The results are set forth in the table following Example 4.

EXAMPLE 3 (COMPARATIVE)

A blend of 70 parts by weight of Latex B of Example 1 and 30 parts by weight of a latex comprising 80 weight percent styrene, 20 weight percent butadiene and 2 parts by weight of acrylic acid was employed as the binder. This blend was storage stable and no deposition aid was employed. The results are set forth in the table following Example 4.

EXAMPLE 4 (THE INVENTION)

The latex blend employed in this example was a blend of (A) 20 parts by weight, solids basis, of a latex comprising 20 parts by weight methacrylic acid, 24 parts by weight ethyl acrylate and 56 parts by weight of methyl methacrylate and (B) 80 parts by weight, solids basis, of a latex comprising 57.5 parts by weight styrene, 40.5 parts by weight butadiene and 2 parts by weight fumaric acid at a pH of 5. This blend was storage stable and no deposition aid was employed. The results are set out in the following table.

TABLE I

| | Ex. 1 | Ex. 2 | Ex. 3 | Ex. 4 |
|---|---|---|---|---|
| Percent latex on Fiber | A-2% B-13% | 15% | 5% 10% | 3% 12% |
| Deposition Time in seconds at 27° C. | <30 | 20 | 55 | 70 |
| Freeness Time in seconds (Williams) | 25 | 10 | 22 | 13 |
| Freeness Temp. °C. | 55 | 55 | 55 | 48 |
| Drain Time in seconds | 32 | 10 | 28 | 17 |
| Drain Temp. °F. | 120 | 120 | 120 | 124 |
| Room Temp. Tensile[1] (lbs) | 52 | 33 | 36 | 37.5 |
| Room Temp. Elong.[2] (percent) | 5.3 | 7.0 | 5.7 | 4.7 |
| Mullen Burst[3] (lbs) | 73 | 50 | 60 | 70 |
| Hot Tensile[4] (lbs) (1 min. @ 350° F.) | 30 | 18 | 18 | 22 |
| Hot Elong.[5] (%) | 2.7 | 6.0 | 7.3 | 4.2 |
| DOP Tensile[6] (18 hrs.) (lbs) | 23 | 8 | 10 | 18 |
| DOP Elongation[6] (%) | 3 | 9 | 6 | 4.7 |
| Taber Stiffness[7] | 300 | 100 | 180 | 182 |
| DOP Stiffness[8] | 210 | 30 | 30 | 106 |
| Pickup (%) | 45–48 | 70–80 | 70–80 | 45–50 |
| Sheet Density (lbs/ft³) | 50–55 | 50–60 | 50–60 | 50–60 |

FOOTNOTES TO TABLE I
[1]Room temperature Tensile - Determined at 72° F. and 50% relative humidity. Strength measured and recorded in pounds pull at break. Test run on an Instron testing instrument. Chart speed - 5"/min, Jaw separation - 6 inches, and crosshead speed - 1"/min. All samples 1" in width.
[2]Room temperature elongation - Determined at 72° F. and 50% relative humidity. Percent stretch of sheet before break.
[3]Mullen Burst - Determined on a B.P. Perkins mullen tester.
[4]Hot Tensile - Tensile strength in lbs at 350° F. Sheet is heated to 350° F. and held at this temperature for 1 minute in order to reach equilibrium. Then while still at 350° F., the tensile strength at break is determined.
[5]Hot Elongation - Same procedure as hot tensile. The elongation is determined at 350° F. at break.
[6]DOP Tensile and Elongation - The tensile strength and elongation at break of a 1" sheet that has been soaked in DOP for 18 hours at room temperature.
[7]Taber Stiffness - The taber stiffness (determined on Taber tester) measured to 15° deflection of the sheet.
[8]After 1 hour at room temperature in dioctyl phthalate (DOP) plasticizer.

Referring to the table, the elongation data from the four examples is as follows:

| | Ex. 1 | Ex. 2 | Ex. 3 | Ex. 4 |
|---|---|---|---|---|
| Room Temperature | 5.3 | 7.0 | 5.7 | 4.7 |
| 350° F. | 2.7 | 6.0 | 7.3 | 4.2 |
| DOP | 3.0 | 9.0 | 6.0 | 4.7 |

Example 4 shows the least variation in elastomeric properties regardless of the exposure, which is an important property in the production of continuous vinyl floor cover, especially during printing operations.

EXAMPLE 5 (COMPARATIVE)

A single latex comprising, on a solids basis, 50 parts by weight of butyl acrylate, 48 parts by weight of styrene and 2 parts by weight acrylic acid was employed as the sole binder. The results are set forth in Table II.

EXAMPLE 6 (THE INVENTION)

The latex blend employed in this example was a blend of (A) 20 parts by weight, solids basis, of Component (A) of Example 4 and (B) 80 parts by weight, solids basis, of the latex employed in Example 5. In both Examples 5 and 6 the percent latex on fiber was 15%. Drain temperature was 120° F.

TABLE II

| | Example 5 | Example 6 |
|---|---|---|
| Deposition Time in seconds at 27° C. | 60 | 75 |
| Drain time | 12" | 15" |
| Room Temperature Tensile | 18 lbs. | 33 lbs. |
| Room Temperature Elongation | 2% | 2.1% |
| Mullen Burst | 35 | 37 |
| Hot Tensile | 4.5 lbs | 11.5 lbs. |
| Hot Elongation | 1.2% | 1.2% |
| DOP Tensile (18 hrs) | 1.5 lb. | 10 lbs. |
| DOP Elongation | 1.7% | 1.7% |
| Taber Stiffness | 200 | 215 |

The several tests were conducted as described in the footnotes to Table I.

EXAMPLE 7 (COMPARATIVE)

A single latex comprising, on a solids basis, 50 parts by weight of vinylidene chloride, 48 parts by weight of butadiene, 1 part by weight of fumaric acid and 1 part by weight of acrylic acid was employed as the sole binder. The results are set forth in Table III.

EXAMPLE 8 (THE INVENTION)

The latex blend employed was a blend of (A) 20 parts by weight, solids basis, of Component (A) of Example 4 and (B) 80 parts by weight, solids basis, of the latex employed in Example 7. Again, in both Examples 7 and 8, the percent latex on fiber was 15% and drain temperature was 120° F.

TABLE III

|  | Example 7 | Example 8 |
| --- | --- | --- |
| Deposition time in seconds at 27° C. | 80 | 85 |
| Drain Time | 12" | 14" |
| Room Temperature Tensile | 16 lbs. | 27 lbs. |
| Room Temperature Elongation | 4.8% | 3.3% |
| Mullen Burst | 38 | 40 |
| Hot Tensile | 10 lbs. | 19 lbs. |
| Hot Elongation | 2.3% | 2.4% |
| DOP Tensile (18 hrs) | 6 lbs. | 13.5 lbs. |
| DOP Elongation | 4.1% | 2.5% |
| Taber Stiffness | 50 | 138 |

The several tests were conducted as described in the footnotes to Table I.

The room temperature tensile, DOP tensile and hot tensile of Examples 6 and 8 clearly show the improved strength of sheets made in accordance with the present invention.

What is claimed is:

1. Composition consisting essentially of asbestos fibers and a blend having a pH of 7 or less of at least two latexes wherein the solids in the blended latexes consist essentially of (A) from 10 to 30 parts by weight of a carboxylated copolymer consisting essentially of 10 to 25 parts by weight of methacrylic acid and correspondingly 90 to 75 parts by weight of at least one unsaturated carboxylic acid ester of the formula $CH_2=C(R_2)COOR_1$, wherein $R_1$ is an alkyl group containing 1 to 8 carbon atoms and $R_2$ is hydrogen or methyl and (B) 90 to 70 parts by weight of at least one synthetic rubber.

2. Composition of claim 1 wherein (A) comprises 15 to 25 parts by weight of the latex solids.

3. Composition of claim 3 wherein the acid is methacrylic acid and the ester is a mixture of ethylacrylate and methylmethacrylate.

4. Composition of claim 3 wherein the synthetic rubber (B) is a carboxylated styrene-butadiene rubber.

5. Composition of claim 4 wherein the rubber comprises 40 to 70 parts by weight butadiene and 60 to 30 parts by weight styrene.

* * * * *

UNITED STATES PATENT AND TRADEMARK OFFICE
CERTIFICATE OF CORRECTION

PATENT NO. : 4,246,155

DATED : January 20, 1981

INVENTOR(S) : Kenneth R. Meath; Kent B. McReynolds; Donald M. Blake

It is certified that error appears in the above—identified patent and that said Letters Patent is hereby corrected as shown below:

Column 3, line 16, delete "butdadiene" and insert --butadiene--.

Column 6, claim 3, line 20, delete "3" and insert --2--.

Signed and Sealed this

Fourteenth Day of July 1981

[SEAL]

Attest:

Attesting Officer

GERALD J. MOSSINGHOFF

Commissioner of Patents and Trademarks